United States Patent
Sumiya et al.

(10) Patent No.: US 7,196,635 B2
(45) Date of Patent: Mar. 27, 2007

(54) INDICATING INSTRUMENT FOR VEHICLE (75) Inventors: Minoru Sumiya, Nagoya (JP);
 Hideyuki Nakane, Nishio (JP)

(73) Assignee: Denso Corporation, Kariya (JP)

( * ) Notice: Subject to any disclaimer, the term of this patent is extended or adjusted under 35 U.S.C. 154(b) by 135 days.

(21) Appl. No.: 10/885,643

(22) Filed: Jul. 8, 2004

(65) Prior Publication Data
 US 2005/0012607 A1    Jan. 20, 2005

(30) Foreign Application Priority Data
 Jul. 14, 2003    (JP)    ............................. 2003-274252

(51) Int. Cl.
 *G08B 5/24*    (2006.01)
(52) U.S. Cl. ........................... 340/815.78; 340/815.74; 340/691.1
(58) Field of Classification Search ................ 340/438, 340/482, 483, 691.1, 691.6, 692, 693.5, 693.9, 340/815.74, 815.78; 362/30, 48; 324/114, 324/166; 439/34, 248; 361/644, 641, 647
 See application file for complete search history.

(56) References Cited

U.S. PATENT DOCUMENTS

| | | | |
|---|---|---|---|
| 4,404,522 A * | 9/1983 | Pucciarello | ................. 324/114 |
| 5,615,080 A * | 3/1997 | Nishitani et al. | ........... 361/664 |
| 5,652,508 A * | 7/1997 | Yamamoto | .................. 324/166 |
| 5,711,675 A * | 1/1998 | Nishitani et al. | ............. 439/34 |
| 5,839,811 A * | 11/1998 | Shimura | ...................... 362/30 |
| 6,633,811 B1 * | 10/2003 | Aumayer | ..................... 701/207 |
| 2003/0043048 A1 | 3/2003 | Wada et al. | |

* cited by examiner

Primary Examiner—Van T. Trieu
(74) Attorney, Agent, or Firm—Posz Law Group, PLC (57) ABSTRACT A circuit board is divided into two portions: a flexible printed circuit board; and a printed circuit board. On the flexible circuit board, movements whose layouts on the flexible circuit board are changed based on a design change in a dial plate due to a model change in a vehicle, light emitting diodes, a connector, a buzzer, and a changing-over switch are mounted. On the printed circuit board, a controller that radiates electrical noise during its operation is mounted. This enables a countermeasure for radiating of the electrical noise from the controller to be completed within the printed circuit board. This also enables a circuit design of the flexible printed circuit board to be easily performed. Man power for designing a combination meter can be thereby decreased; further, the combination meter capable of restricting generation of the electrical noise is achieved.

11 Claims, 7 Drawing Sheets

INDICATING INSTRUMENT FOR VEHICLE

CROSS REFERENCE TO RELATED APPLICATIONS

This application is based on and incorporates herein by reference Japanese Patent Application No. 2003-274252 filed on Jul. 14, 2003.

FIELD OF THE INVENTION

The present invention relates to an indicating instrument that is mounted on a vehicle and rotates a pointer according to measured values. The present invention is suitably applied to an automobile.

BACKGROUND OF THE INVENTION

Conventionally, an indicating instrument for vehicles includes a dial plate having a plurality of display portions; light sources for luminously displaying the dial plate; movements for extending their pointer shafts forward of the dial plate; control circuits for driving the movements so that the pointer shafts are rotated by angles according to individual measured values detected by external detectors or the like and also for controlling ON and OFF of the light sources; and a printed circuit board. The printed circuit board is disposed backward of the dial plate to constitute an electric circuit by accommodating the light sources, the movements, and the control circuits. For example, this is described in JP-2003-75206-A (U.S. 2003/0043048 A1).

In the above instrument, the respective light sources or movements are formed on the printed circuit board in correspondence to positions of the display portions, i.e., indicators that indicate existence/nonexistence of abnormality and operating states of parts of the vehicle; gauges for various instruments. Further, the control circuits are appropriately disposed in free spaces other than spaces for the light sources and the movements.

The light sources include light emitting diodes (LEDs), while the movements include a cross-coil type actuator or a stepping motor.

The movement is driven by applying voltage in pulse to it. Also, the LEDs are controlled in their lighting by applying the voltage in pulse to them. This varies a duty of ON/OFF, enabling easy control of lighting intensity.

Namely, a control circuit generates the voltage in pulse, so that so-called electrical noise is radiated and potentially adversely affects other electric devices mounted on the vehicle, e.g., a radio receiver, a phone.

The electrical noise level from the printed circuit board varies depending on wiring patterns thereof, i.e., positions of the LEDs, movements, and control circuits. Therefore, the positions of the LEDs, movements, and control circuits are adjusted so that the radiated noise can be decreased to a harmless level.

Further, when the above indicating instrument is mounted on a different vehicle type, or when the display portions of the dial panel are changed by the design change due to a model change of a vehicle or the like, the LEDs and the movements simultaneously need changing in their layouts.

As a result, in response to installation in a different vehicle type, or to a model change of a vehicle, work cycles are repeated to decrease the electrical noise to the harmless level each time the printed circuit is re-designed. The work cycle includes circuit designing, prototype manufacturing, evaluating, design improving, etc., which entails a lot of man power.

SUMMARY OF THE INVENTION

It is an object of the present invention to provide an indicating instrument capable of restricting electrical noise radiated without increasing man power in designing a printed circuit, by devising a structure of the printed circuit.

To achieve the above object, an indicating instrument for a vehicle includes as follows: dial panel having a display portion; a light source that luminously displays the dial panel; a movement that is for driving a pointer and including a shaft for the pointer that extends forward of the dial panel; and a control circuit that is for controlling driving of the movement and putting on and off of the light source. Further, it includes a design board where the movement and the light source is mounted; and a control board where the control circuit is mounted. Here, the design board and the control board are constructed separately from each other.

Generally, electrical noise on a printed circuit board is generated mainly by a control circuit, while a movement and a light source generate much less electrical noise. Further, layouts of the movement and light source are changed according to a design change of a dial plate due to a model change of a vehicle, while an electrical circuit structure or control specifications within a control circuit are maintained constant regardless of the layouts of the movement and light source on the printed circuit.

In the above structure of the present invention, the printed circuit board is divided into two boards: a design board where the movement and light source are mounted; and a control board where the control circuit is mounted. Here, in designing the design board, man power for decreasing the arising electrical noise can be eliminated. Further, in designing the control board, the effective countermeasure for the electrical noise can be adopted without considering the layouts of the movement and light source. This enables the electrical noise radiated from the control board to be securely decreased.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An indicating instrument for a vehicle according to the present invention is directed to a combination meter for an automobile.

First Embodiment

A combination meter 1 displays various information relating to a relevant vehicle and is disposed in such a manner that a driver seated in the front driver seat can see the combination meter 1.

Figure 1:
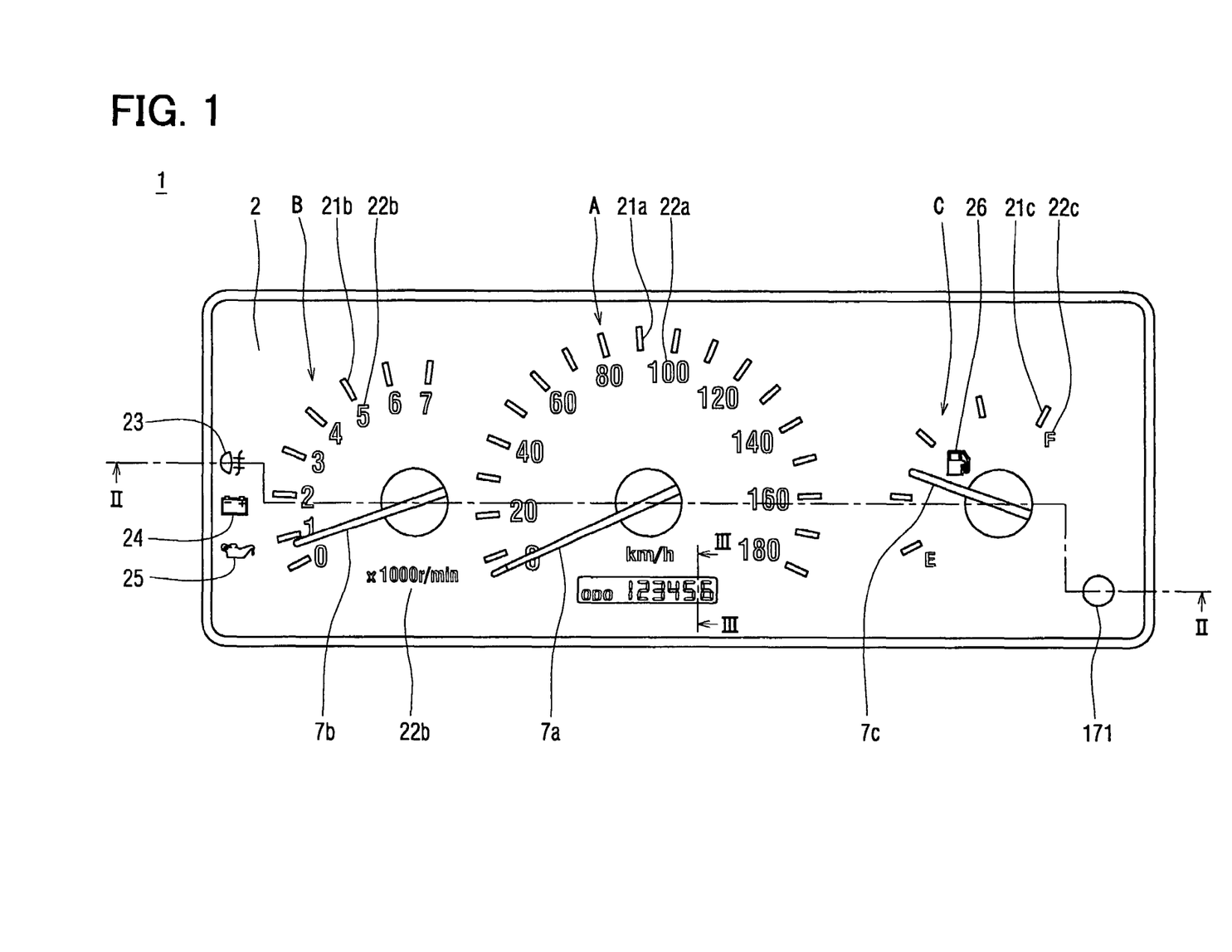
FIG. 1 is a front view of a combination meter according to a first embodiment of the present invention.

The combination meter 1 primarily includes, in its dial plate 2, indicating instruments of a speedometer A, tachometer B, and fuel meter C; and display portions of a fog lamp indicator 23, voltage indicator 24, and oil pressure indicator 25, as shown in FIG. 1. Hereinafter, "front" or "forward" of the combination meter 1 is the side, surface, space, etc. of the combination meter 1 that faces the driver seat, while "back" or "backward" of the combination meter 1 is the side, surface, space, etc. of the combination meter 1 that is opposite to the "front" or "forward."

The dial plate 2 is formed of a thin plate made of transparent polycarbonate resin etc. In the dial plate 2, scales, characters, and various indicators are formed, as shown in FIG. 1, i.e., the scales 21a and characters 22a constituting the speedometer A for displaying a traveling speed of the relevant vehicle; the scales 21b and characters 22b constituting the tachometer B for displaying an engine rotation number of the relevant vehicle; the scales 21c and characters 22c constituting the fuel meter C for displaying a remaining fuel amount of the relevant vehicle; the fog lamp indicator 23 for indicating a lighting state of the fog lamp; the voltage indicator 24 for indicating a voltage decrease to less than a given level in a battery 48; the oil pressure indicator 25 for indicating an amount decrease to less than a given level in a lubricating oil.

The scales 21a, 21b, 21c, characters 22a, 22b, 22c, indicators 23, 24, 25 are formed by applying a hot stamp, a print, etc. to either of the front surface 2a (upper portion in FIG. 2) or back surface 2b (lower portion in FIG. 2) of the dial plate 2. Namely, a colored layer having opacity is formed on surface areas other than the scales 21a, 21b, 21c, characters 22a, 22b, 22c, indicators 23, 24, 25 of the dial plate 2, while the scales 21a, 21b, 21c, characters 22a, 22b, 22c, indicators 23, 24, 25 are kept transparent without being colored. Otherwise, a translucent colored layer is applied to them.

Figure 2:
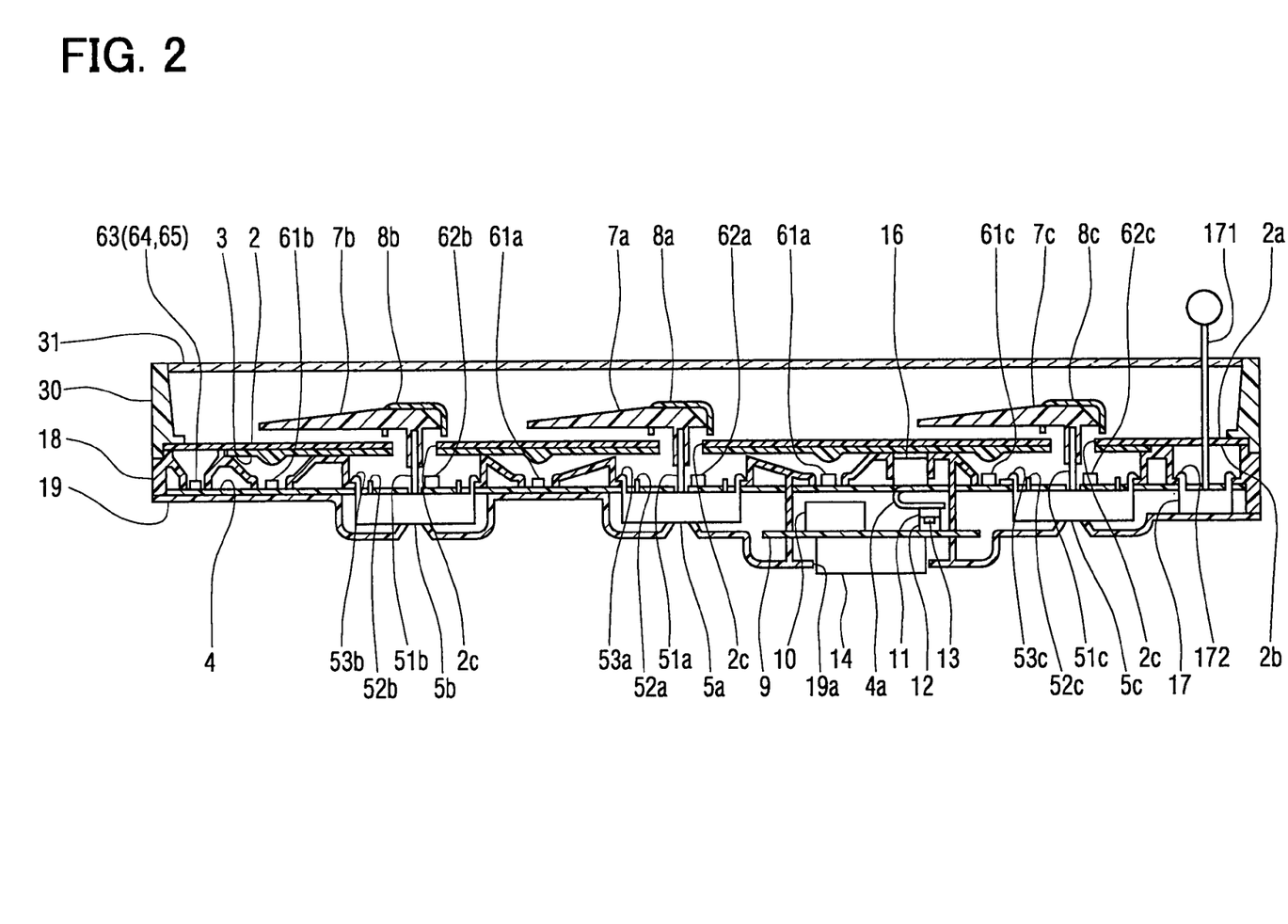
FIG. 2 is a sectional view taken from a line II to II in FIG. 1.

Further, the dial plate 2 has penetrating holes 2c in the approximately longitudinally centered horizontal line as shown in FIG. 2. Through the penetrating holes 2c, shafts 51a, 51b, 51c of pointer shafts of the movements 5a, 5b, 5c that are disposed backward (lower portion in FIG. 2) of the dial plate 2 extend forward (upper portion in FIG. 2) of the dial plate 2.

Below the back surface of the dial plate 2, a light conducting plate 3 is disposed to be appressed to the dial plate 2 for conducting light emitted from the LEDs 61a, 61b, 61c of light sources to thereby display the scales 21a, 21b, 21c, and characters 22a, 22b, 22c by transmitted illumination. The conducting plate 3 is formed of transparent polycarbonate resin etc.

Further, backward (lower portion in FIG. 2) of the dial plate 2, a flexible printed circuit board 4 of a design board is disposed. The flexible printed circuit board 4 constitutes a electrical circuit portion of the combination meter 1 and is formed by attaching an conductive material on a flexible electrically insulating material to thereby form a given wiring pattern. The conductive material includes copper foil, while the flexible electrically insulating material includes a sheet-shaped resin.

On the flexible printed circuit 4, the LEDs 61a, 61b, 61c, 63, 64, 65 of the light sources are mounted for luminously displaying the display portions, as shown in FIG. 2. Namely, the scales 21a and characters 22a are backlit and displayed by transmitted illumination from the light emitted by the LEDs 61a; the scales 21b and characters 22b are backlit and displayed by transmitted illumination from the light emitted by the LED 61b; and the scales 21c and characters 22c are backlit and displayed by transmitted illumination from the light emitted by the LED 61c. Further, the fog lamp indicator 23 is backlit and displayed by transmitted illumination from the light emitted by the LED 63; the voltage indicator 24 is backlit and displayed by transmitted illumination from the light emitted by the LED 64; and the oil pressure indicator 25 is backlit and displayed by transmitted illumination from the light emitted by the LED 65.

In the combination meter 1 of the first embodiment, white LEDs are adopted as the LEDs 61a, 61b, 61c. A green LED is adopted as the LED 63. Red LEDs are adopted as the LEDs 64, 65. Accordingly, the scales 21a, 21b, 21c and characters 22a, 22b, 22c are luminously displayed in white. The fog lump indicator 23 is luminously displayed in green. The voltage indicator 24 and oil pressure indicator 25 are luminously displayed in red.

On the flexible printed circuit 4, three movements 5a, 5b, 5c are mounted for rotating the respective pointers in the three indicating instruments of the speedometer A, tachometer B, and fuel meter C, respectively. Namely, terminal pins 52a, 52b, 52c of the movements 5a, 5b, 5c are soldered on the flexible printed circuit board 4.

The movements 5a, 5b, 5c are formed of cross-coil actuators, stepping motors, or the like for rotating the shafts 51a, 51b, 51c of the pointing shafts by the angles corresponding to the respective external electrical signals (in the first embodiment, a vehicle speed signal, an engine rotation signal, and a liquid level signal). The shafts 51a, 51b, 51c of the movements 5a, 5b, 5c pass through the penetrating holes 2c of the dial plate 2 and outwardly extend so as to fix pointers 7a, 7b, 7c to their tops.

The pointers 7a, 7b, 7c are formed of a transparent material such as a transparent acryl resin etc. and are luminously displayed by incident light emitted from the LEDs 62a, 62b, 62c mounted on the flexible printed circuit board 4. Namely, the LEDs 62a, 62b, 62c are disposed on the flexible printed circuit board 4 in such a manner that lights emitted from them pass through the penetrating holes 2c and enter the pointers 7a, 7b, 7c, respectively. Further, light shielding caps 8a, 8b, 8c are disposed for preventing the lights of the LEDs 62a, 62b, 62c from directly entering eyes of the driver, respectively, as shown in FIG. 2. Here, the movements 5a, 5b, 5c are fixed to and positioned in the casing 18 to be described later, using locking hooks 53a, 53b, 53c.

Figure 3:
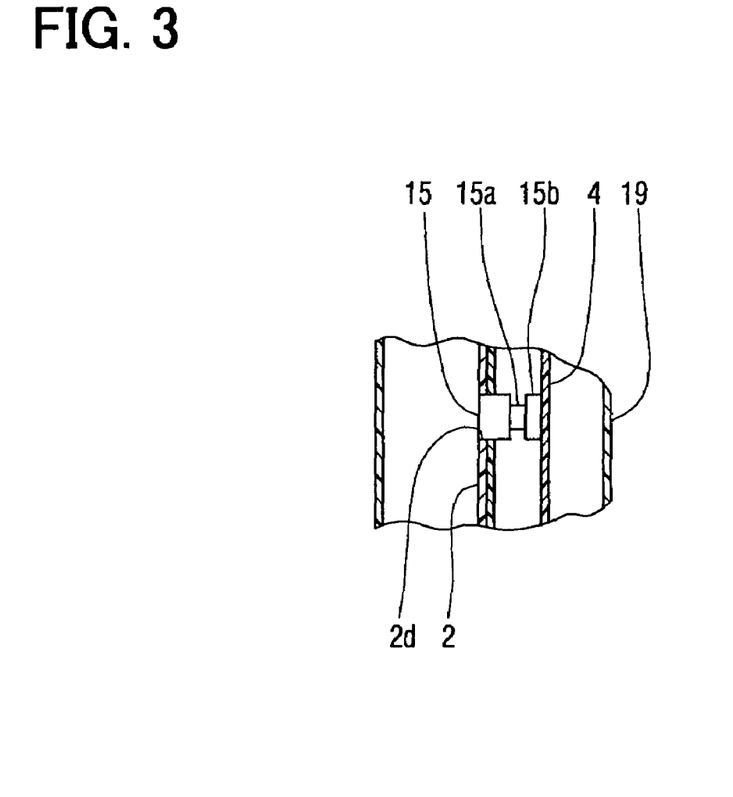
FIG. 3 is a partial sectional view taken from a line III to III in FIG. 1.

Further, a connector 15b is mounted on the flexible printed circuit 4, and is electrically connected and fitted with a connector 15*a* that is integrated with a liquid crystal panel 15, as shown in FIG. 3. Here, the liquid crystal panel 15 functions as a notification unit for displaying characters and figures on its screen, and is disposed in the dial panel 2 for digitally showing a distance driven of the relevant vehicle. Namely, the liquid crystal panel 15 functions as an odometer of an accumulated distance driven for displaying a total distance driven of the relevant vehicle and a trip meter of an interval distance for displaying a distance driven from after the driver conducts a given manipulation. Further, the liquid crystal panel 15 is fixed to the casing 18; an opening 2*d* is formed in the dial panel 2 for the driver to see the liquid crystal panel 15 as shown in FIG. 3.

Further, on the flexible printed circuit board 4, a changing-over switch 17 is mounted for the driver to manipulate to switch displaying items in the liquid crystal panel 15. Namely, the odometer is switched to the trip meter, of which display is reset to "0 km" at the same time. The changing-over switch 17 includes a push rod 171 for the driver to manipulate; the top of the push rod 171 extends outward from the combination meter 1, as shown in FIG. 2. The changing-over switch 17 is fixed and positioned to the casing 18 via a locking hook 172, as shown in FIG. 2.

Further, on the flexible printed circuit board 4, a buzzer 16 is mounted as a sounding unit and notification unit, being fixed and positioned to the casing 18.

Further, on the flexible printed circuit board 4, a first connector 11 is mounted for electrically connecting the flexible printed circuit board 4 with the printed circuit board 9 by being connected and fitted with a second connector 12 on the printed circuit board 9. The first connector 11 is mounted on a connecting portion 4*a* formed by extending a part of the flexible printed circuit board 4. Namely, the connecting portion 4*a* functions as a lead wire. In this embodiment, the connecting portion 4*a* is constructed to be integrated with the flexible printed circuit board 4; however, it can be constructed as the necessary number of lead wires, instead of the connecting portion 4*a*.

Incidentally, it is supposed that the dial plate 2 is changed in its design due to a model change, a vehicle type change, or the like of a vehicle where the combination meter 1 is mounted. Here, various electrical components mounted on the flexible printed circuit board 4 are changed in their mounting layouts on the flexible printed circuit board 4, accordingly. Here, the various electrical components include the LEDs 61*a*, 61*b*, 61*c*, 62*a*, 62*b*, 62*c*, 63, 64, 65, movements 5*a*, 5*b*, 5*c*, connector 15*b*, and changing-over switch 17. In other words, in the combination meter 1 of this embodiment, the electrical components whose layouts are changed in association with the design change of the dial plate 2 are intensively mounted on the flexible printed circuit board 4.

Backward of the flexible printed circuit board 4 (lower portion in FIG. 2), the printed circuit board 9 of the control board is disposed. The printed circuit board 9 is made of glass epoxy board or the like. A controller 10 of the control circuit is mounted on this board 9.

Figure 4:
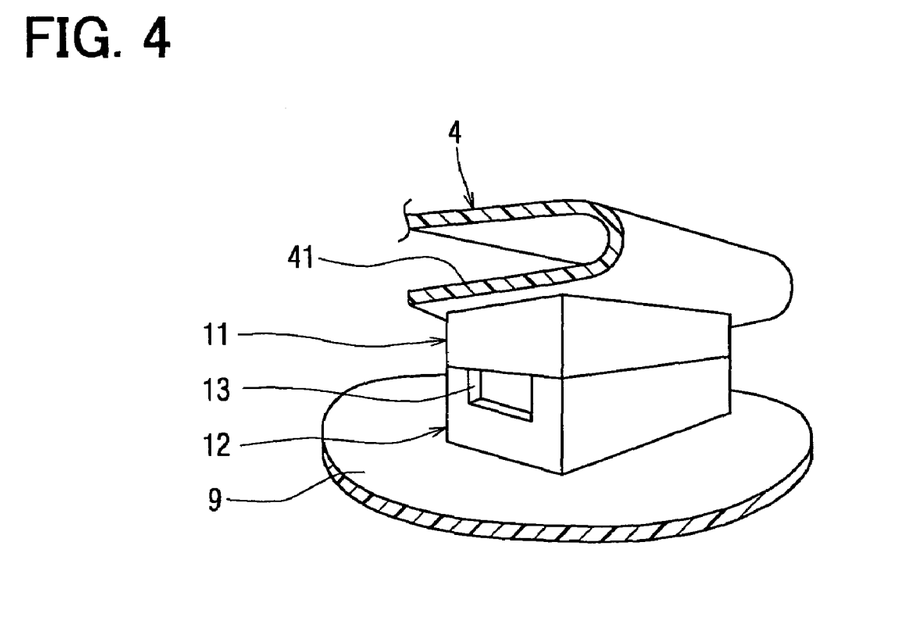
FIG. 4 is a partial perspective view of a combination meter according to the first embodiment.

On the printed circuit board 9, the second connector 12 is mounted for electrically connecting the printed circuit board 9 with the flexible printed circuit board 4 by being connected and fitted with the first connector 11 on the flexible printed circuit board 4. The second connector 12 includes a concave portion 13 facing the first connector 11, as shown in FIGS. 2, 4.

The function and effect of the concave portion 13 will be explained below. When the printed circuit board 9 is removed from the combination meter 1, the first and second connectors 11, 12 that are connected and fitted with each other are separated from each other, first of all.

Without the concave portion 13, an operator separates the first and second connectors 11, 12 by pulling them in the separating directions while one hand holding the flexible printed circuit board 4 and the other hand holding the printed circuit board 9. This applies force to a soldering portion between the flexible printed circuit board 4 and the first connector 11, and to a soldering portion between the printed circuit board 9 and the second connector 12, resulting in possible damage to the soldering portions and a possible defect in electrical connection.

Figure 5A:
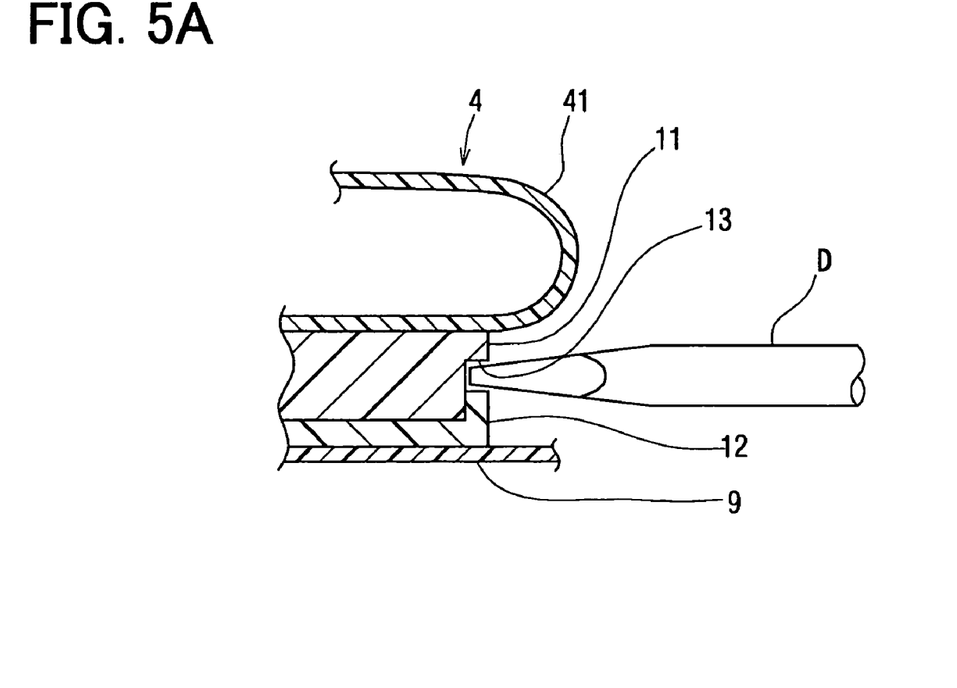
FIG. 5A is a view of a state prior to separation in a procedure for separating a first and second connectors according to the first embodiment.
Figure 5B:
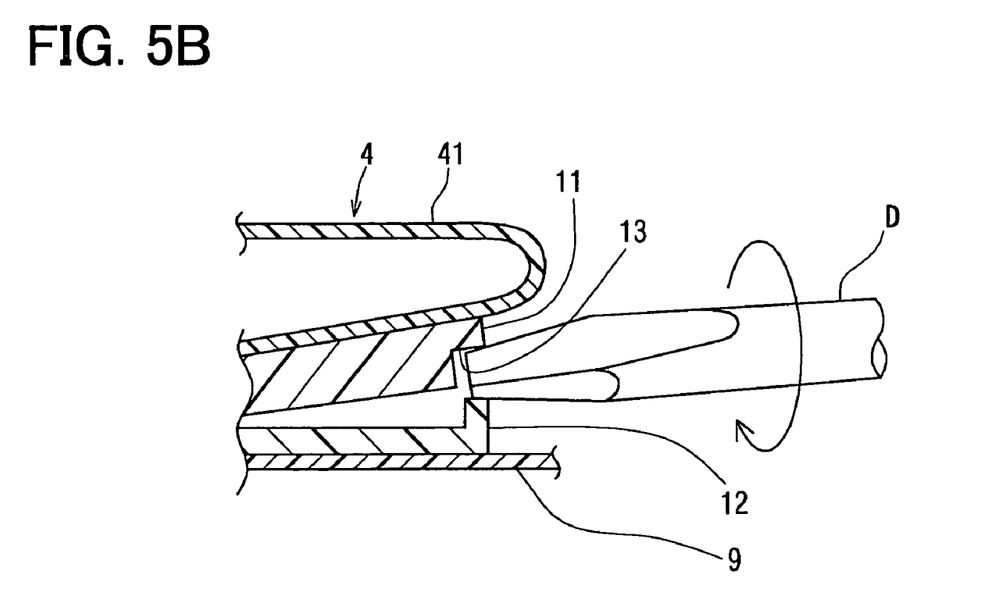
FIG. 5B is a view of a state posterior to separation in a procedure for separating a first and second connectors according to the first embodiment.

By contrast, when the concave portion 13 is provided, at first a top of a tool such as a screw driver D is inserted deeply into the concave portion 13 as shown in FIG. 5A; next, the screw driver D is axially rotated. The first and second connectors 11, 12 are thereby separated from each other as shown in FIG. 5B. During this operation, the force derived from the screw driver D is applied only to the connectors themselves 11, 12, while no force is applied to the above soldering portions. Therefore, the first and second connectors 11, 12 can be separated without damage to the soldering portions.

Further, a connector 14 is mounted on the printed circuit board 9 for electrically connecting the combination meter 1 with an external portion as shown in FIG. 2. Namely, via the connector 14, the combination meter 1 is provided with power from the battery 48 and electrical signals necessary for display operation.

The printed circuit board 9 is positioned in a space where the movements 5*a*, 5*b* do not overlap nor intersect with the printed circuit board 9 in their shaft directions (vertical direction in FIG. 2).

The controller 10 is constructed of a hybrid IC or the like including a micro-computer and controls various electrical signals inputted from outside of the combination meter 1. Namely, the controller 10 controls lighting and extinguishing (putting on and off) of the LEDs 61*a*, 61*b*, 61*c*, 62*a*, 62*b*, 62*c*, 63, 64, 65, drives the movements 5*a*, 5*b*, 5*c*, and rotates the shafts 51*a*, 51*b*, 51*c* by respective angles. Further, the controller 10 switches displays of the crystal display panel 15 when the drive manipulates the changing-over switch 17.

The controller mounted on the printed circuit board 9 includes a high-speed switching circuit for driving the movements 5*a*, 5*b*, 5*c*, so that electrical noise arises to possibly adversely affect operation of other electronic devices mounted on the relevant vehicle, such as a radio receiver. Therefore, to prevent radiation of the electrical noise, an electrical noise preventing circuit is formed by mounting various electronic elements around the controller 10.

In a conventional indicating instrument for a vehicle, an electrical circuit is constituted by a single printed circuit board, where a control circuit is mounted along with movements and LEDs. When the design of a dial plate is changed due to a model change in a vehicle, the layouts of the movements, LEDs, and control circuit are changed, accordingly. A large amount of processes thereby become necessary for circuit designing, prototype manufacturing, evaluating, improving, etc.

By contrast, in the combination meter 1 of the first embodiment, the controller 10 being a reason for generating the electrical noise is mounted on the printed circuit board 9, while being separated from the flexible printed circuit board 4 where the movements, LEDs are mounted. In other words, the controller 10 is independently separated from the flexible printed circuit board 4 where the layouts of electrical components mounted are changed based on the model change of a vehicle or the like.

This enables a countermeasure on the printed circuit board 9 for electrical noise radiation from the controller 10 to be securely performed. Even when the layouts of the movements, LEDs, etc. are changed on the printed circuit board 4 due to a model change in a vehicle, the change in the printed circuit board 9 can be eliminated. The man power can be thereby remarkably decreased in designing the combination meter 1 pertinent to the model change etc.

The dial plate 2, light conducting plate 3, flexible printed circuit board 4, and printed circuit board 9 are fixed to the casing 18, which is formed by, e.g., mold formation of resin and constitutes a bone structure of the combination meter 1. To the casing 18, the movements 5*a*, 5*b*, 5*c*, and changing-over switch 17 are fixed and positioned via the locking hooks 53*a*, 53*b*, 53*c*, 172. The buzzer 16 is further fixed and positioned to the casing 18.

The casing 18 holds the dial plate 2 as a single plane and the flexible printed circuit board 4 parallel to the dial plate 2. Namely, in the combination meter 1 of the first embodiment, the dial plate 2 and flexible printed circuit board 4 are disposed parallel to each other. The shafts 51*a*, 51*b*, 51*c* of the movements 5*a*, 5*b*, 5*c* are thereby perpendicular to the dial plate 2; the dial plate 2 and each rotation display portion corresponding to rotation areas of the pointers 7*a*, 7*b*, 7*c* are parallel to each other. In other words, gaps between the dial plate 2 and the respective pointers 7*a*, 7*b*, 7*c* are maintained constant regardless of the rotation angles. This enhances an appearance of the combination meter 1. Further, the lights can be thereby emitted from the LEDs 61*a*, 61*b*, 61*c*, 62*a*, 62*b*, 62*c* in incident angles of approximately zero degree to the portions in the dial plate 2 corresponding to the respective light sources. That is, the lights emitted from the LEDs 61*a*, 61*b*, 61*c*, 62*a*, 62*b*, 62*c* are perpendicular to the dial plate 2. This enhances efficiency in usage of the lights emitted from the LEDs 61*a*, 61*b*, 61*c*, 62*a*, 62*b*, 62*c*.

Backward of the casing 18 (lower portion in FIG. 2), a back cover 19 is attached. The back cover 19 is made of, e.g., a resin material and covers the back side of the casing 18. The back cover 19 includes an opening 19*a*, as shown in FIG. 2, through which an external electrical wire (not shown) is connected with the connector 14.

Forward of the dial plate 2, a transparent cover 31 is attached via a facing end plate 30 of an approximate frame shape. The transparent cover 31 is made of transparent resin thin plate, glass, etc. and prevents dusts or the like from entering the inside of the combination meter 1.

Figure 6:
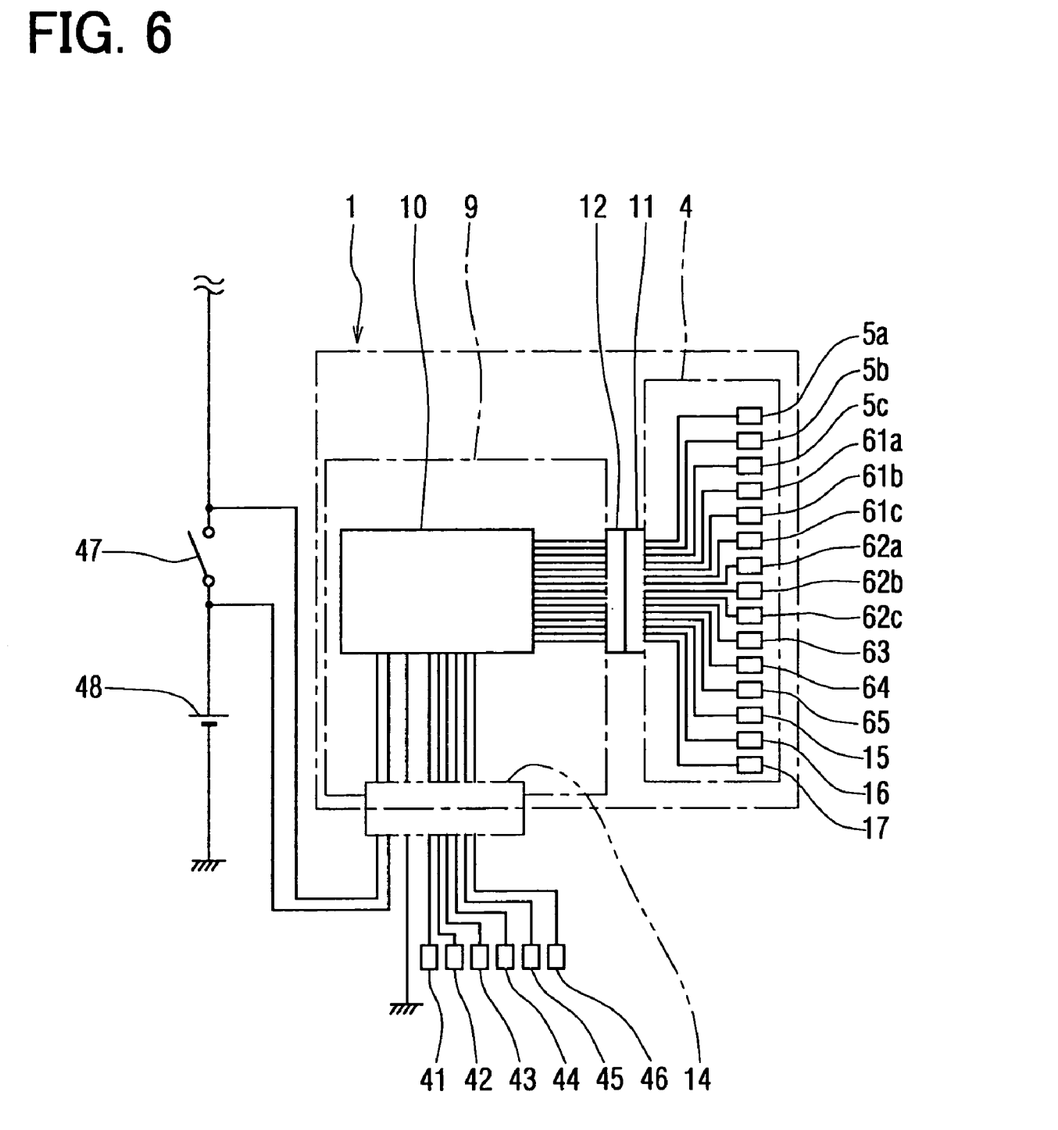
FIG. 6 is a diagram explaining a structure of an electrical circuit of a combination meter according to the first embodiment.

Next, a structure of an electrical circuit of the combination meter 1 according to the first embodiment will be explained below with reference to FIG. 6. The controller 10 is constantly provided with the power from the battery 48 and connected with an ignition switch 47 to detect an operating state (ON or OFF) of the ignition switch 47. Further, the controller 10 is connected with a speed sensor 41, rotation sensor 42, fuel level sensor 43, fog lamp switch 44, voltage sensor 45, lubricating oil pressure sensor 46 to receive their detection signals. Here, electrical connection with the outside of the combination meter 1 is performed via the connector 14 mounted on the printed circuit board 9.

The controller 10 is connected with the components mounted on the printed circuit board 9, i.e., the movements 5*a*, 5*b*, 5*c*, LEDs 61*a*, 61*b*, 61*c*, 62*a*, 62*b*, 62*c*, 63, 64, 65, buzzer 16, and changing-over switch 17. Electrical connection between the flexible printed circuit board 4 and printed circuit board 9 is performed by connecting and fitting the connectors 11, 12.

As explained above, the connector 14 that is electrically connected with the external devices is mounted on the printed circuit board 9, so that the route of the electrical signal within the combination meter 1 can be minimized. The external electrical noise is thereby prevented from entering the control circuit of the combination meter 1.

An operation of the combination meter 1 according to the first embodiment will be explained below. When a driver turns on the ignition switch 47 to activate a vehicle, the controller 10 detects the ignition switch turned on and puts on the LEDs 61*a*, 61*b*, 61*c*, 62*a*, 62*b*, 62*c*. This luminously displays the scales 21*a*, 21*b*, 21*c*, and the characters 22*a*, 22*b*, 22*c* along with the pointers 7*a*, 7*b*, 7*c*.

The controller 10 drives the movements 5*a*, 5*b*, 5*c* to rotate the shafts 51*a*, 51*b*, 51*c* by the corresponding angles based on the detection signals from the speed sensor 41, rotation sensor 42, and fuel level sensor 43, respectively. The pointer 7*a*, 7*b*, 7*c* thereby indicate a traveling speed, an engine rotation number, and a remaining fuel amount, respectively. The controller 10 further drives the liquid crystal panel 15 to display either a total distance driven or an interval distance driven based on a selection signal from the changing-over switch 17.

When the driver puts on the fog lamp (not shown) by manipulating the fog lamp switch 44, the controller detects it and puts on the LED 63. The fog lamp indicator 23 is thereby displayed in green on the dial plate 2.

When the voltage of the battery 48 is decreased to less than a given level due to any reason during the vehicle operation, the controller 10 detects the voltage decrease via the voltage sensor 45 and puts on the LED 64. The voltage indicator 24 is thereby luminously displayed in red on the dial panel 2. At the same time, the controller 10 drives the buzzer 16 for a given period for sounding an alarm.

Similarly, when the lubricating oil pressure of the engine is decreased to less than a given level due to any reason during the vehicle operation, the controller 10 detects the pressure decrease via the lubricating oil pressure sensor 46 and puts on the LED 65. The oil pressure indicator 25 is thereby luminously displayed in red on the dial panel 2. At the same time, the controller 10 drives the buzzer 16 for a given period for sounding an alarm.

As explained above, in the combination meter 1 according to the first embodiment of the present invention, the LEDs 61*a*, 61*b*, 61*c*, 62*a*, 62*b*, 62*c*, 63, 64, 65, movements 5*a*, 5*b*, 5*c*, connector 15*b*, buzzer 16, and changing-over switch 17 are mounted on the flexible printed circuit board 4, while the controller 10 that drives the above-described electrical components is mounted on the printed circuit board 9. In other words, a circuit board constituting the electrical circuit of the combination meter 1 is divided into two boards. One of the two boards is the flexible printed circuit board 4 that accommodates the electrical components whose layouts on the flexible printed circuit board 4 need changing according to the design change of the dial plate 2 due to a model change of a vehicle or the like. Here, the electrical components mounted on the flexible printed circuit board 4 scarcely generates electrical noise. By contrast, the other board of the two is the printed circuit board 9 that accommodates the controller 10 that is not so much affected by the design change of the dial plate 2 due to a model change of a vehicle or the like and that generates electrical noise while operating.

In a conventional indicating instrument for a vehicle, a single board constitutes the electrical circuit, so that the control circuit is mounted on the same board as the board where the movements and LEDs are mounted. Therefore, when the design of the dial plate is changed, the layouts of the movements, LEDs, control circuit are changed, accordingly. A large amount of man power is thereby required for circuit designing to decrease the electrical noise, prototype manufacturing, evaluating, improving, etc.

By contrast, in the combination meter 1 of this embodiment, the controller 10 that is not so much affected by the design change of the dial plate 2 and that generates the electrical noise is mounted on the printed circuit board 9, separately from the flexible printed circuit board 4 where the movements, LEDs, etc. The preventive countermeasure for the electrical noise from the controller 10 can be thereby performed within the printed circuit board 9; further, the circuit design for the flexible printed circuit board 4 can be easily conducted at the model change of a vehicle. Therefore, this can remarkably decrease man power for designing the combination meter 1 corresponding to the model change etc., and achieve the combination meter 1 capable of restricting the electrical noise generation.

Furthermore, by adopting the above structure, a single printed circuit board 9 can be used in common, while multiple flexible printed circuit boards 4 are prepared for the different layouts of the movements, LEDs, or the like. The number of kinds of the components can be thereby decreased, so that the cost of the combination meter 1 can be decreased.

Further, in the combination meter 1 of this embodiment, the printed circuit board 9 is positioned between the movements 5a, 5c in such a manner that the movements 5a, 5c do not overlap not intersect with the printed circuit board 9 in their axial directions. In other words, the printed circuit board 9 along with the movements 5a, 5b, 5c is disposed backward of the flexible printed circuit board 4 without intersecting the adjacent movements 5a, 5c.

This enables the printed circuit board 9 to be positioned in a free space between the adjacent movements 5a, 5c, thereby decreasing a dimension (or depth) of an axial direction of the shaft 51a to result in improvement in installation of the combination meter 1 on a vehicle.

Further, the first connector 11 mounted on the flexible printed circuit board 4 and the second connector 12 mounted on the printed circuit board 9 are fitted and connected with each other, so that the boards 4, 9 are electrically connected. Here, the second connector 12 includes the concave 13 facing the first connector 11. In this structure, when the both connectors 11, 12 are separated from each other, they can be separated by inserting the tool 13 into the concave portion 13 and rotating the tool 13, without involving damage to the soldering portions between the boards 4, 9 and connectors 11, 12, respectively. Further, when the flexible printed circuit board 4 is adopted, damage to the electrical conductor for instance, copper foil, can be also restricted.

The LEDs as light sources are disposed on the front surface (forward) of the flexible printed circuit board 4 while the movements are disposed on the back surface (backward) of the flexible printed circuit board 4. A distance between the light sources and the dial plate 2 can be thereby designed without being affected by the movements, so that light emitted from the light sources can be effectively used.

The combination meter 1 is typically contained within an instrument panel forward of the driver seat. Within the instrument panel, a fan duct is also disposed for air-conditioning, e.g., near the either lateral ends of the combination meter 1. Therefore, the shape of the combination meter 1 particularly in a peripheral area has a limitation derived from the interference with the fan duct.

By contrast, in this embodiment, the printed circuit board 9 is disposed between the movements, so that the printed circuit board 9 can be disposed to be separated from the peripheral area. The thickness in the peripheral area can be thereby decreased, so that installation of the combination meter 1 on the vehicle can be improved.

Furthermore, the flexible printed circuit board 4 adopted in this embodiment is cheaper than a rigid printed circuit board, e.g., glass epoxy board, so that the cost of the combination meter 1 can be decreased.

Second Embodiment

Figure 7:
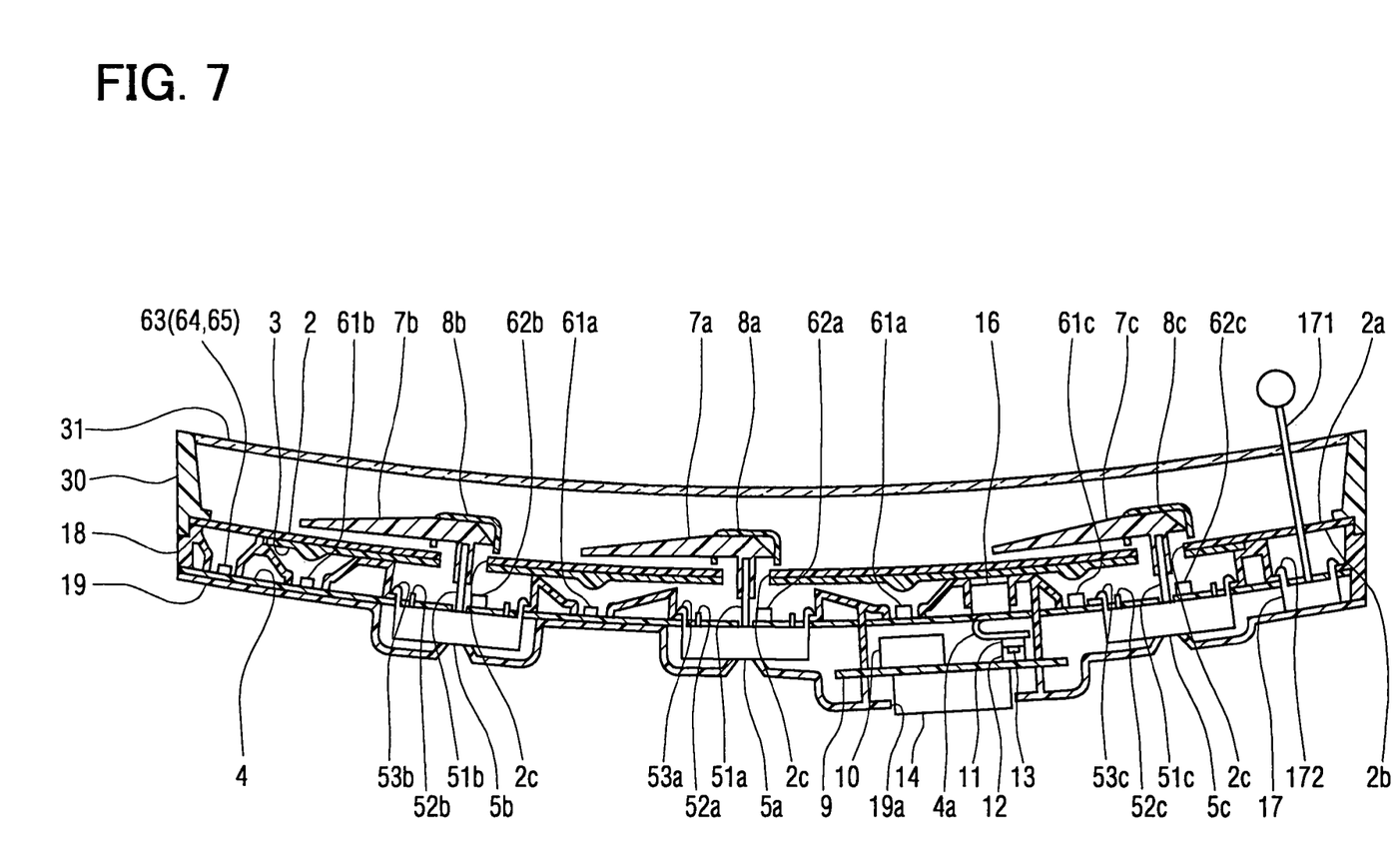
FIG. 7 is a sectional view of a combination meter according to a second embodiment of the present invention.

A combination meter 1 according to a second embodiment of the present invention will be explained with reference to FIG. 7. A dial plate 2 of the combination meter 1 of the second embodiment has a curved shape, and a flexible printed circuit board 4 is disposed parallel to the dial plate 2, as shown in FIG. 7. Movement 5a, 5b, 5c are disposed in such a manner that shafts 51a, 51b, 51c are perpendicular to the dial plate 2. LEDs 61a, 61b, 61c, 62a, 62b, 62c are disposed so that incident angles relative to the dial plate 2 are approximately zero degree.

The dial plate 2 and each of rotation display portions of rotation areas of the pointers 7a, 7b, 7c are parallel to each other. In other words, gaps between the dial plate 2 and each of the pointers 7a, 7b, 7c are maintained constant regardless of the respective rotation angles. This enhances an appearance of the combination meter 1. Further, the lights are emitted from the LEDs 61a, 61b, 61c, 62a, 62b, 62c perpendicularly to the dial plate 2. This enhances efficiency in usage of the lights emitted from the LEDs 61a, 61b, 61c, 62a, 62b, 62c. Furthermore, regarding a liquid crystal panel 15, a perpendicular line on an approximately centered area of the screen of the liquid crystal panel 15 is maintained to be perpendicular to the dial plate 2. Therefore, two gaps in the both lateral ends of the liquid crystal panel 15 between the liquid crystal panel 15 and dial plate 2 become symmetrical. This also enhances an appearance of the combination meter 1.

Third Embodiment

Figure 8:
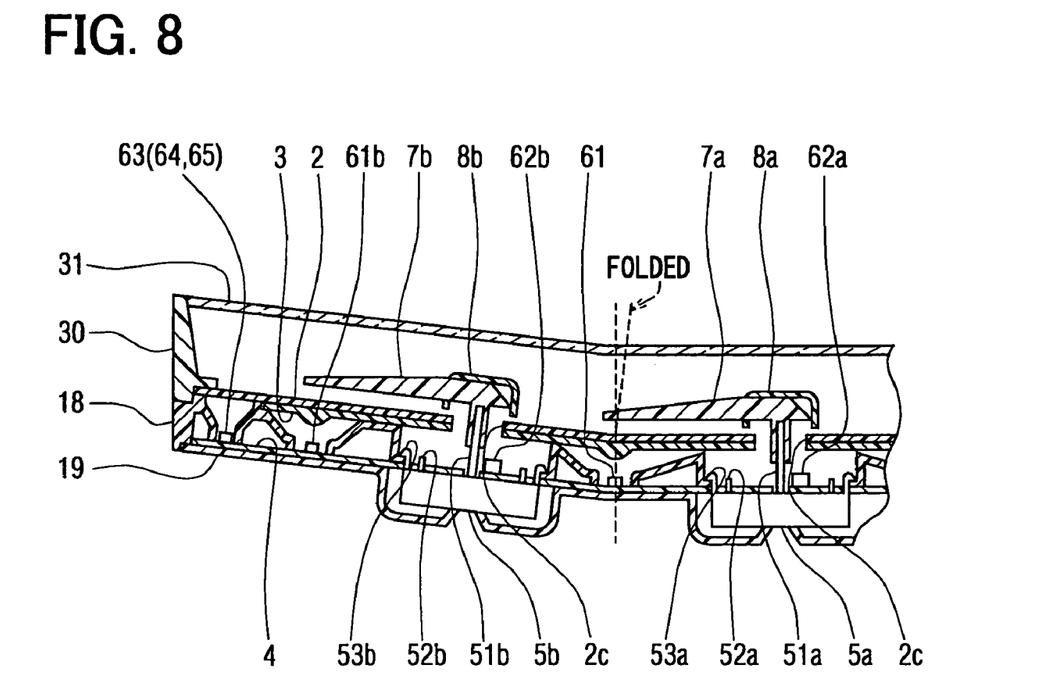
FIG. 8 is a partial sectional view of a combination meter according to a third embodiment of the present invention.

A meter 1 according to a third embodiment of the present invention will be explained with reference to FIG. 8. A dial plate 2 of the combination meter 1 of the third embodiment has a folded surface, and a flexible printed circuit board 4 is disposed parallel to the dial plate 2, namely the flexible printed circuit board 4 also has the fold surface as that of the dial plate 2. Similarly to the second embodiment, movement 5a, 5b are disposed in such a manner that shafts 51a, 51b are perpendicular to the dial plate 2. LEDs 61a, 61b, 62a, 62b are disposed so that incident angles relative to the dial plate 2 are approximately zero degree.

The dial plate 2 and each of rotation display portions of rotation areas of the pointer 7a, 7b are parallel to each other. In other words, gaps between the dial plate 2 and the pointers 7a, 7b are maintained constant regardless of the rotation angles. This enhances an appearance of the combination meter 1. Further, the lights are emitted from the LEDs 61a, 61b, 62a, 62b perpendicularly to the dial plate 2. This enhances efficiency in usage of the lights emitted from the LEDs 61a, 61b, 62a, 62b.

Fourth Embodiment

Figure 9:
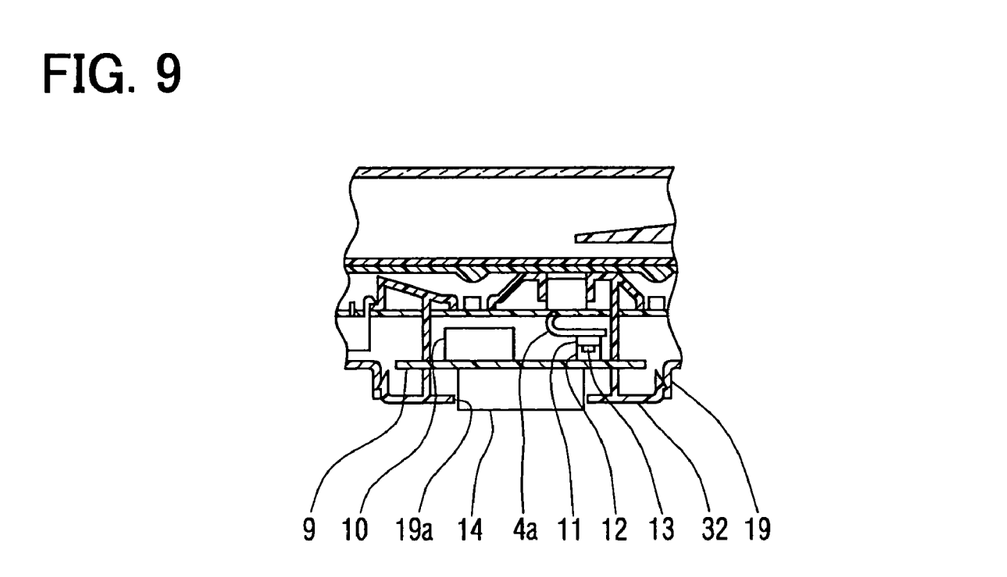
FIG. 9 is a partial sectional view of a combination meter according to a fourth embodiment of the present invention.

A meter 1 according to a fourth embodiment of the present invention will be explained with reference to FIG. 9. A back cover 19 includes an opening 19a through which a printed circuit board 9 can pass, and a cover 32 is provided for covering the opening 19c. The printed circuit board 9 can be thereby easily removed from the combination meter 1 while the combination meter 1 is mounted on the vehicle.

Others

In the above embodiments, the changing-over switch 17 is mounted on the flexible printed circuit board 4; however, a variable resistor or rotary encoder being a pulse generator for adjusting lighting intensity in the dial plate 2 can be mounted instead of, or in addition to the changing-over switch 17.

In the above embodiments, three movements are included in the combination meter 1; however, the number of movements can be one, two, four, or more without limiting to three.

In the above embodiments, as the display portions provided in the dial plate 2, the fog lamp indicator 23, voltage indicator 24, and oil pressure indicator 25 are provided; however, at least one of the three indicators can be replaced with another display portion, or an additional display portion can be provided. This additional display portion can include a direction indicator, brake liquid level indicator, airbag abnormality indicator, and the like.

In the above embodiments, the liquid crystal panel 15 is used as an odometer and trip meter; however, without limiting to them, other information can be displayed, e.g., a temperature of a vehicle interior, a temperature of outside of the vehicle, various alarms, etc.

It will be obvious to those skilled in the art that various changes may be made in the above-described embodiments of the present invention. However, the scope of the present invention should be determined by the following claims.

What is claimed is:

1. An indicating instrument for a vehicle, the indicating instrument comprising:
    a dial panel having a display portion;
    a light source that luminously displays the dial panel;
    a movement that is for driving a pointer and including a shaft for the pointer that extends forward of the dial panel;
    a control circuit that is for controlling driving of the movement and putting on and off of the light source;
    a design board where the movement and the light source are mounted; and
    a control board where the control circuit is mounted,
    wherein the movement and the light source are not mounted to the control board,
    wherein the design board and the control board are constructed separately from each other,
    wherein the design board is disposed forward of the movement,
    wherein the control board is disposed backward of the design board so that the control board does not overlap or intersect with the movement in a direction of a shaft of the movement,
    wherein the movement is one of a plurality of movements, and
    wherein the control board is disposed backward of the design board so that the control board is disposed between adjacent movements.

2. The indicating instrument of claim 1, further comprising:
    a notifying unit that notifies a driver of the vehicle of information,
    wherein the notifying unit is mounted on the design board, and
    wherein the control circuit controls an operation of the notifying unit.

3. The indicating instrument of claim 2,
    wherein the notifying unit includes at least one of a sounding unit and a displaying unit that displays at least one of a character and a figure on a screen thereof.

4. The indicating instrument of claim 1,
    wherein a manipulating unit manipulated by a driver of the vehicle is mounted on the design board.

5. The indicating instrument of claim 4,
    wherein the manipulating unit includes at least one of a switch, a variable resistor, and a pulse generator.

6. The indicating instrument of claim 1,
    wherein the design board is formed of a flexible printed circuit board.

7. The indicating instrument of claim 6,
    wherein the dial plate is formed to have one of a curved surface and a folded surface, and
    wherein the shaft of the movement is perpendicular to the dial plate, and the light source has an incident angle of approximately zero degree relative to the dial plate.

8. The indicating instrument of claim 7, further comprising:
    a displaying unit that notifies a driver of the vehicle of information and displays at least one of a character and a figure on a screen thereof,
    wherein the displaying unit is mounted on the design board,
    wherein the control circuit controls an operation of the displaying unit, and
    wherein a perpendicular line on an approximately centered area of the screen is perpendicular to the dial plate.

9. The indicating instrument of claim 7,
    wherein the design board is formed to have the one of the curved surface and the folded surface, and is approximately parallel with the dial plate.

10. The indicating instrument of claim 1,
    wherein a connector that electrically interconnects between the indicating instrument and an external unit is mounted on the control board.

11. The indicating instrument of claim 1, further comprising:
    a first connector that is mounted on the design board; and
    a second connector that is mounted on the control board,
    wherein the first connector and the second connector connect and fit with each other so that the design board and the control board are electrically connected with each other, and so that a space is formed in a portion of a boundary between the design board and the control board, and
    wherein the first connector and the second connector are disconnected with a tool that is inserted between the space and then manipulated.

* * * * *